United States Patent [19]

Oberster et al.

[11] Patent Number: 4,567,211

[45] Date of Patent: Jan. 28, 1986

[54] NAPHTHALENIC DERIVATIZED PLASTICIZERS FOR POLYPHOSPHAZENE POLYMERS

[75] Inventors: Arthur E. Oberster, North Canton, Ohio; John C. Vicic, Houston, Tex.

[73] Assignee: The Firestone Tire & Rubber Company, Akron, Ohio

[21] Appl. No.: 707,761

[22] Filed: Mar. 4, 1985

[51] Int. Cl.⁴ .............................................. C08K 5/01
[52] U.S. Cl. ..................................... 521/98; 521/189; 524/485; 524/612
[58] Field of Search ................. 524/485, 612; 521/98, 521/189

[56] References Cited

U.S. PATENT DOCUMENTS 4,124,567 11/1978 Dieck et al. ...................... 521/189
4,535,095 8/1985 Mueller .............................. 521/189

Primary Examiner—Lewis T. Jacobs
Attorney, Agent, or Firm—Frank J. Troy, Sr.

[57] ABSTRACT

Plasticized polyphosphazene compositions exhibiting excellent flame resistance and low smoke output are disclosed. The plasticizers are resinous alkylated naphthalenes condensed with formaldehyde which are characterized by methylene bridges between naphthalenic rings with softening points ranging from 28° F. to 158° F.

14 Claims, No Drawings

NAPHTHALENIC DERIVATIZED PLASTICIZERS FOR POLYPHOSPHAZENE POLYMERS

BACKGROUND OF THE INVENTION

The instant invention relates to plasticized polyphosphazene homopolymers and copolymers. These plasticized resins are useful in the production of foams, insulation, cushioning formulations, wire coating formulations and other low smoke, low flammability formulations.

The preparation of polyphosphazene polymers has been disclosed in U.S. Pat. No. 3,370,020, Allcock; U.S. Pat. No. 3,856,712, Reynard et al.; U.S. Pat. No. 3,856,713, Rose et al.; U.S. Pat. No. 3,883,451, Reynard et al. Many plasticizers or polymer softeners are known in the polymer industry including hydrocarbon processing oils, phthalate ester plasticizers and triaryl phosphates. In general, these plasticizers adversely effect flammability and lead to the generation of large amounts of smoke. Recently, as shown in U.S. Pat. No. 4,107,108, Dieck et al., polyphosphazene homopolymers and copolymers have been plasticized with compatible, fully substituted or partially substituted cyclophosphazenes. However, these cyclophosphazene plasticizers are expensive and must be utilized at fairly high levels to produce satisfactory resin performance.

DESCRIPTION OF THE INVENTION

This invention relates to plasticized polyphosphazene polymers which exhibit excellent flame resistance and low smoke output. More particularly, the invention relates to polyphosphazenes which are plasticized with a class of resins which, when compounded with the elastomeric phosphazene polymers, have substantially little or no effect upon the smoke and flame properties of the resulting plasticized elastomer. The class of plasticizers which has been found to be effective in the present invention are resinous aromatic hydrocarbons which are characterized by methylene bridges between naphthalenic rings and which have softening points ranging from 28° F. to 158° F.

The aromatic plasticizers which are useful in the instant invention are represented by the following structural formula:

$$AR-CH_2-AR-CH_2]_n AR \qquad \text{FORMULA I}$$

wherein $n = 1, 2, 3$ or $4$ and AR is an alkylated naphthalene. The alkylated naphthalene rings (AR) are independently substituted with one to four alkyl groups which may each range from $C_1$-$C_6$ alkyl independently. These alkyl substituents may be linear or branched.

The naphthalenic resins represented by Formula I are prepared as the condensation product from formaldehyde and one or more alkylated naphthalene compounds. These resinous naphthalenic plasticizers are currently available under the trademark KENFLEX® resins. The preferred plasticizer for use in the present invention is commercially available as KENFLEX A. KENFLEX A has a flash point of 175° C., a boiling point at 20 mm of 204° C., and a specific gravity of 1.09.

The naphthalenic resin plasticizers of the instant invention can be utilized in both foamed and non-foamed polyphosphazene rubbers to effectively plasticize the rubbers while exhibiting no adverse effects on flame-retardant properties and little effect on smoke generation upon burning in the flaming or nonflaming mode. Also, they may be employed in lower amounts than the plasticizers of the prior art to provide the desired plasticization properties while retaining the excellent flame-retardant and low smoke properties. Foams produced by the instant invention in general are lower in cost and possess a lower foam density than those containing an equal amount of prior art plasticizers.

The aromatic plasticizers set forth above have been found to be useful in a variety of prior art phosphazene polymers. The phosphazene polymers described in the prior art contain repeating units represented by the formulas:

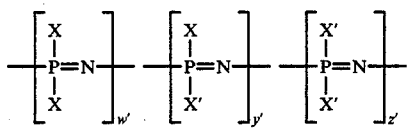

Wherein X and X' can be the same or different and represent substituted or unsubstituted alkoxy, aryloxy, amino or mercapto substituent groups or mixtures thereof and are known in the state of the art of polyphosphazene technology; and $5 \leq (w'+y'+z') \leq 50,000$ per polymer and $(y'+z') > 0$. The substituent on the various substituted groups, i.e. substituted alkoxy, substituted aryloxy substituted amino or mercapto groups, may be any substituent which is non-reactive with the various materials present during polymer formation. Suitable substituents include chlorine, bromine, nitro, cyano, phenoxy, alkoxy, alkyl and the like. Where the presence of crosslinking functionality is desired on the phosphazene polymer backbone, crosslinking functionality can be introduced in the polymer molecule through the use of ethylenically unsaturated substituent groups in addition to the groups X and X' set forth above. Examples of suitable crosslinking moieties which can be utilized are set forth in U.S. Pat. Nos. 4,055,520; 4,061,606; 4,073,824; 4,073,825; and 4,076,658 which are hereby incorporated by reference and include o-allylphenoxy and —OCH=CH$_2$ groups as well as similar groups which contain unsaturation. These substituents containing crosslinking functionality can be present in the polyphosphazene polymer backbone in amounts ranging from 0.1 to 50 mole percent based on the total substituents on the polyphosphazene polymer backbone. These unsaturated substituent groups are represented by repeating units of the formulas:

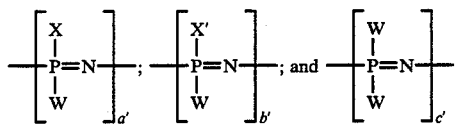

wherein X and X' are defined above, W represents an ethylenically unsaturated substituent group and $0 < (a'+b'+c') \leq 25,000$ per polymer.

The naphthalenic resin plasticizers can be utilized in any plasticization effective amounts depending on the desired utilization of the final product. The amount of such plasticizers useful in the composition in accordance with the present invention may vary from about 0.5 to 35, preferably 2 to 15, most preferably 5 to 10 by weight based on 100 parts of polymeric phosphazene.

The plasticized compositions of the invention depending on their intended end use may be blended with special purpose additives such as antioxidants, stabilizers, processing aids, lubricants, dyes, pigments, fillers, sulfur curing agents and accelerators (e.g. zinc dimethyldithiocarbamate), peroxide curing agents (e.g. benzoyl peroxide), initiators, blowing agents and the like.

The typical polyphosphazene foam formulation could include:

Phosphazene polymer: 100 parts
Filler (e.g., alumina trihydrate): 0–300 phr
Stabilizer (e.g., Magnesium oxide): 2.5–10 phr
Processing aid (e.g., zinc stearate): 2.5–10 phr
Blowing agent (e.g., 1,1'-azobisformamide): 10–50 phr
Activator (e.g., oil-treated urea): 10–40 phr
Sulfur or peroxide curing agent: 1–20 phr
Naphthalenic resin plasticizer: 0.5–35 phr While the above are preferred formulation guidelines, obviously some or all of the adjuvants may be omitted, replaced by other functionally equivalent materials, or the proportions varied, within the skill of the art of the foam formulator. Specific foam formulations are illustrated in the Examples.

In one suitable process, the foamable ingredients are blended together to form a homogeneous mass; for example, a homogeneous film or sheet can be formed on a 2-roller mill, preferably with one roll at ambient temperature and the other at moderately elevated temperature, for example 120°–140° F. The homogeneous foamable mass can then be heated, to provide a foamed structure; for example, by using a mixture of a curing agent having a relatively low initiating temperature, such as benzoyl peroxide, and a curing agent having a relatively high initiating temperature, such as 2,5-dimethyl-2,5-di(t-butylperoxy)hexane, and partially precuring in a closed mold for about 6–30 minutes at 200°–250° F., followed by free expansion for 30–60 minutes at 300°–350° F. In the alternative, the foaming may be accomplished by heating the foamable mass for 30–60 minutes at 300°–350° F. using a high temperature or low temperature curing agent, either singly or in combination. One benefit of utilizing the "partial precure" foaming technique is that an increase in the molecular weight of the foamable polymer prior to the foaming step enables better control of pore size and pore uniformity in the foaming step. The extent of "precure" desired is dependent upon the ultimate foam characteristics desired. The desired foaming temperature is dependent on the nature of the blowing agent and the crosslinkers present. The time of heating is dependent on the size and shape of the mass being foamed. The resultant foams vary from flexible to semirigid, depending upon the relative amounts and the Young's modulus of the elastomeric and nonelastomeric polymers employed in the foam formulation. As indicated, inert, reinforcing or other fillers such as alumina trihydrate, hydrated silicas, antimony trioxide or calcium carbonate can be added to the foams and the presence of these and other conventional additives should in no way be construed as falling outside the scope of this invention.

Also as mentioned above, the plasticized compositions of this invention can be crosslinked at moderate temperatures by conventional free radical and/or sulfur curing techniques when minor amounts of unsaturated groups are present in the copolymer backbone. The ability of these compositions to be cured at temperatures below about 350° F. makes them particularly useful as potting and encapsulation compounds, sealants, wire coatings and the like. These plasticized materials are also useful for preparing crosslinked foams which exhibit significantly increased tensile strengths over uncured foams. These compositions are often crosslinked in the presence of inert, reinforcing or other fillers and the presence of these and other conventional additives are deemed to be within the scope of this invention.

The following examples are set forth for purposes of illustration only and are not to be construed as as limitations of the present invention except as set forth in the appended claims. All parts and percentages are by weight unless otherwise indicated.

In the following examples the following base polymer stock formulation was plasticized. The aryloxy substituted polyphosphazene resin which was employed in the stock formulation was poly-p-ethylphenoxy-phenoxy-o-allylphenoxy phosphazene containing the following percentage of substituents: 55% - p-ethylphenoxy; 40% - phenoxy; and 5% - o-allylphenoxy.

| Base Polymer Stock Formulation | |
|---|---|
| Component | Parts By Weight |
| Aryloxy substituted polyphosphazene | 100 |
| $Al_2O_3.3H_2O$ | 110 |
| $Mg(OH)_2$ | 55 |
| HA-2 (Methylphenylvinylsilane) | 10 |
| PETA (Pentaarythritol tetraacrylate) | 10 |
| ZnO | 4 |
| Stearic acid | 9 |
| Blowing Agents | |
| $NaHCO_3$ | 15 |
| Celogen OT [p,p-oxybis(benzenesulfonyl hydrazide)] | 15 |
| Pip-Pip (piperidinium-pentamethylene dithiocarbamate) | 2 |
| Methyl zimate (zinc dimethyl dithiocarbamate) | 0.5 |
| Butyl zimate (zinc dibutyl dithiocarbamate) | 0.5 |
| Sulfur | 7 |

EXAMPLE 1

Five parts of KENFLEX A was added to the above-identified base polymer stock formulation using conventional rubber mixing and processing equipment such as Banbury or Brabender mixing apparatus and sheeted on a 2-roll mill. The formulation was precured for three minutes at 230° F. in a closed mold followed by free expansion in an air circulating oven at 300° F. for 10 minutes. The resulting foam possessed a foam density of 120 $Kg/m^3$ and National Bureau of Standards (NBS) smoke rating of F (flaming)=62 and NF (non-flaming)=65.

EXAMPLE 2

Five parts of KENFLEX A was added to the base polymer stock formulation which was treated in accordance with the procedures of Example 1. The resulting foam displayed a foam density of 136 $Kg/m^3$ and an NBS smoke ratio of F=61 and NF=75.

EXAMPLE 3

Five parts of KENFLEX A was added to the base polymer stock formulation which was treated in accordance with the procedures of Example 1. The resulting foam displayed a foam density of 136 $Kg/m^3$, an NBS smoke rating of F=68 and NF=63, and an oxygen index measurement of 34–35.

EXAMPLE 4

Ten parts of KENFLEX A was added to the base polymer stock formulation which was treated in accordance with the procedures of Example 1. The resulting foam displayed a foam density of 104 Kg/m³, an NBS smoke rating of F=83 and NF=55 and an oxygen index measurement of 33-33.5.

COMPARATIVE EXAMPLES 1A-6A

In the comparative plasticized polyphosphazene formulations displayed in Table 1, plasticizers (Examples 1A and 2A) such as CUMAR P-10 (a cummareneindene resin) and APN oil (Examples 3A, 4A and 5A) were employed in the base polymer stock formulation and prepared in accordance with the procedures of Example 1.

Foam formulations such as displayed in Example 6A and Table 1 were prepared which contained no plasticizers and would not expand upon attempted foaming and yielded a cured stock with a density greater than 800 Kg/m³.

In the following examples the following base polymer stock formulation was plasticized. The aryloxy substituted polyphosphazene resin which was employed in the stock formulation was poly-p-ethylphenoxy-phenoxy-o-allylphenoxy phosphazene containing the following percentage of substituents: 55% - p-ethylphenoxy; 40% -phenoxy; and 5% - o-allylphenoxy.

| Base Polymer Stock Formulation A | |
|---|---|
| Component | Parts By Weight |
| Aryloxy substituted polyphosphazene | 100 |
| Al₂O₃.3H₂O | 180 |
| Zinc stearate | 10 |
| HA-2 (Methylphenylvinylsilane) | 10 |
| Carbowax (polyethylene glycol, M.W. = 3,000–3,700) | 2 |
| Celogen AZ-130 (Azodicarbonamide) | 25 |
| Pip-Pip (piperidinium-pentamethylene dithiocarbamate) | 2 |
| Methyl zimate (zinc dimethyl dithiocarbamate) | 0.5 |
| Butyl zimate (zinc dibutyl dithiocarbamate) | 0.5 |
| Sulfur | 7 |

EXAMPLE 5

Ten parts of KENFLEX A was added to the above-identified base polymer stock formulation A which was treated in accordance with the procedures of Example 1. The resulting foam displayed a foam density of 80 Kg/m³, an NBS smoke rating of NF=50, and an oxygen index measurement of 40.

COMPARATIVE EXAMPLE 7A

In comparative Example 7A 10 parts of APN oil were employed in base polymer stock formulation A and prepared in accordance with the procedures of Example 1. The foam formulation of comparative Example 7A displayed a foam density of 80 Kg/m³, an NBS smoke rating of NF=40 and an oxygen index measurement of 40.

TABLE 1

| Example No. | Plasticizer | PPW | Foam Density Kg/m³ | NBS Smoke F | NBS Smoke NF | Oxygen Index |
|---|---|---|---|---|---|---|
| 1 | KENFLEX A | 5 | 120 | 62 | 65 | — |
| 2 | KENFLEX A | 5 | 136 | 61 | 75 | — |
| 3 | KENFLEX A | 5 | 136 | 68 | 63 | 34–35 |
| 4 | KENFLEX A | 10 | 104 | 83 | 55 | 33–33.5 |
| 5 | KENFLEX A | 10 | 80 | — | 50 | 40 |
| Comparative Example No. | | | | | | |
| 1A | CUMAR P-10 | 10 | 176 | 115 | 138 | — |
| 2A | CUMAR P-10 | 20 | 160 | 154 | 161 | — |
| 3A | APN O | 5 | 139 | 90 | 88 | 34.5–35.0 |
| 4A | APN Oil | 10 | 136 | 76 | 68 | — |
| 5A | APN O | 10 | 128 | 85 | 46 | 33–33.5 |
| 6A | None | — | >800 | — | — | — |
| 7A | APN Oil | 10 | 80 | — | 40 | 40 |

It is to be understood that the invention is not limited in scope to the specific embodiments herein disclosed by example.

We claim:

1. A plasticized composition comprising a polyphosphazene polymer and a plasticizer of the formula:

$$AR-CH_2-AR-CH_2]_n AR$$

wherein n=1, 2, 3 or 4 and each AR group is an independently substituted alkylated naphthalene ring.

2. A plasticized composition as defined in claim 1 wherein each of said alkylated naphthalene rings contains one to four alkyl groups independently selected from the group consisting of $C_1-C_6$ alkyl.

3. A plasticized composition as defined in claim 1 wherein said composition comprises 100 parts by weight of polyphosphazene polymer and 0.5 to 35 parts by weight of plasticizer.

4. A plasticized composition as defined in claim 1 wherein said composition comprises 100 parts by weight of polyphosphazene polymer and 2 to 15 parts by weight of plasticizer.

5. A plasticized composition as defined in claim 1 wherein said composition comprises 100 parts by weight of polyphosphazene polymer and 5 to 10 parts by weight of plasticizer.

6. A plasticized composition as defined in claim 1 wherein the polyphosphazene polymer contains repeating units represented by the formulas:

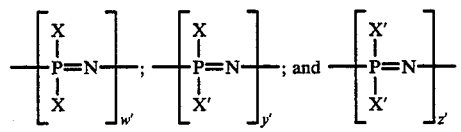

wherein X and X' can be the same or different and are selected from the group consisting of substituted or unsubstituted alkoxy, aryloxy, amino and mercapto groups and mixtures thereof and $5 \leq (w'+y'+z') \leq 50,000$ per polymer.

7. The plasticized composition of claim 6 wherein said polyphosphazene polymer contains additional repeating units represented by the formulas:

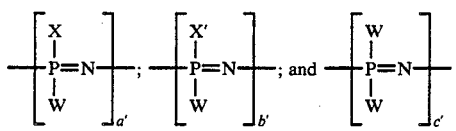

wherein W is an ethylenically unsaturated substituent group and $0 < (a'+b'+c') \leq 25{,}000$ per polymer.

8. A plasticized foam composition comprising a polyphosphazene polymer and a plasticizer of the formula:

$$AR-CH_2-AR-CH_2]_n AR$$

wherein $n = 1, 2, 3$ or $4$ and each AR group is an independently substituted alkylated naphthalene ring.

9. A plasticized foam composition as defined in claim 8 wherein each of said alkylated naphthalene rings contains one to four alkyl groups independently selected from the group consisting of $C_1$–$C_6$ alkyl.

10. A plasticized foam composition as defined in claim 8 wherein said composition comprises 100 parts by weight of polyphosphazene polymer and 0.5 to 35 parts by weight of plasticizer.

11. A plasticized foam composition as defined in claim 8 wherein said composition comprises 100 parts by weight of polyphosphazene polymer and 2 to 15 parts by weight of plasticizer.

12. A plasticized foam composition as defined in claim 8 wherein said composition comprises 100 parts by weight of polyphosphazene polymer and 5 to 10 parts by weight of plasticizer.

13. A plasticized foam composition as defined in claim 7 wherein the polyphosphazene polymer contains repeating units represented by the formulas:

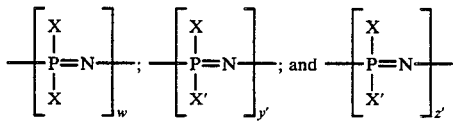

wherein X and X' can be the same or different and are selected from the group consisting of substituted or unsubstituted alkoxy, aryloxy, amino and mercapto groups and mixtures thereof and $5 \leq (w'+y'+z') \leq 50{,}000$ per polymer.

14. The plasticized foam composition of claim 13 wherein said polyphosphazene polymer contains additional repeating units represented by the formulas:

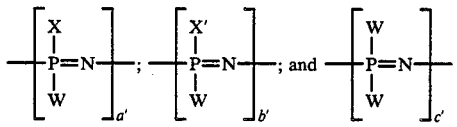

wherein W is an ethylenically unsaturated substituent group and $0 < (a'+b'+c') \leq 25{,}000$ per polymer.

* * * * *

UNITED STATES PATENT AND TRADEMARK OFFICE
CERTIFICATE OF CORRECTION

PATENT NO. : 4,567,211
DATED : January 28, 1986
INVENTOR(S) : Arthur E. Oberster and John C. Vicic It is certified that error appears in the above-identified patent and that said Letters Patent are hereby corrected as shown below:

Column 1, line 47 - FORMULA I

"$AR-CH_2-AR-CH_2]_nAR$" should be -- $AR-CH_2-[AR-CH_2]_nAR$ --

Column 6, line 16 - TABLE 1

"APN O" should be -- APN Oil --

Column 6, line 18, TABLE 1

"APN O" should be -- APN Oil --

Column 6, line 29 - Formula

"$AR-CH_2-AR-CH^2]_nAR$" should be -- $AR-CH_2-[AR-CH_2]_nAR$ --

Column 7, line 13 - Claim 8 - Formula

"$AR-CH_2-AR-CH_2]_nAR$" should be -- $AR-CH_2-[AR-CH_2]_nAR$ --

Signed and Sealed this

Thirteenth Day of May 1986

[SEAL]

Attest:

DONALD J. QUIGG

Attesting Officer

Commissioner of Patents and Trademarks